E. B. WILES.
LOCK NUT.
APPLICATION FILED MAR. 12, 1908.

909,495.

Patented Jan. 12, 1909.

Witnesses:
Chas H Smith
A. La Serrell

Inventor:
Edwin B. Wiles
By Harold Serrell
his Attorney.

UNITED STATES PATENT OFFICE.

EDWIN B. WILES, OF NEW YORK, N. Y.

LOCK-NUT.

No. 909,495.　　　Specification of Letters Patent.　　　Patented Jan. 12, 1909.

Application filed March 12, 1908. Serial No. 420,750.

*To all whom it may concern:*

Be it known that I, EDWIN B. WILES, a citizen of the United States, residing at the borough of Bronx, in the city, county, and State of New York, have invented an Improvement in Lock-Nuts, of which the following is a specification.

Bolts for the fish plates connecting the rails of railways and bolts for other uses in other arts have been employed with lock-nuts of various forms with the object of preventing the accidental loosening of the said nuts, but the results attained have been of more or less indifferent character.

The object of my invention is the production of a lock-nut automatic in its engaging and locking function as brought up toward the work and which can be as readily loosened by the free reverse action of a wrench in un-screwing the nut.

The lock-nut of my invention is formed with one or more holes made generally parallel with an edge face of metal and substantially tangential to the threaded stem of the bolt and hole of the nut. This hole is formed through the nut in a central plane parallel with its flat faces. The hole is of one diameter for about half the distance and of a smaller diameter for the other half of the distance.

I employ a headed pin passing into the larger hole with its head at the bottom of the hole and its stem passing through the smaller hole and projecting beyond the surface of the nut, and a spring of suitable character in the larger hole held in place in any desired manner. These means may be duplicated and reversed in the nut.

Figure 1:
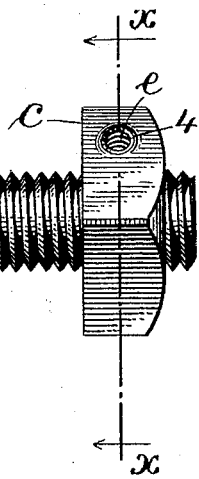
Figure 5:
Figure 2:
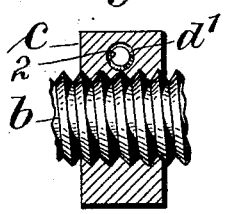
Figure 3:
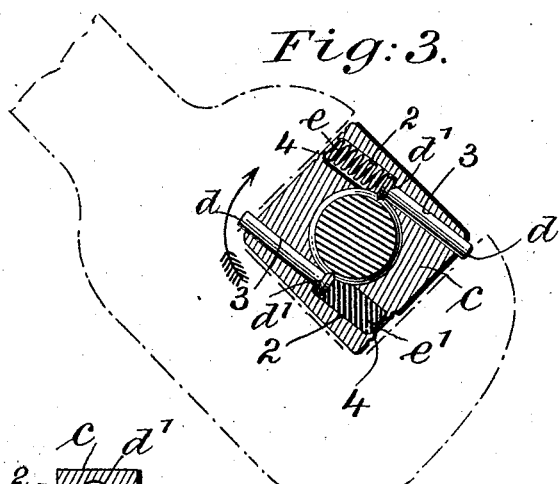
Figure 4:
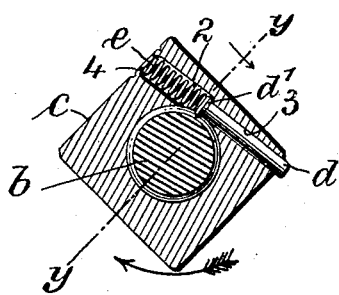
Figure 4:

In the drawing, Figure 1 is an elevation representing the complete lock-nut. Fig. 2 is a cross section at the dotted line $x, x$, of Fig. 1. Fig. 3 is a cross section on the same line showing the parts of Fig. 2 duplicated and reversed, and Figs. 4 and 5 are transverse sections of the nut and elevation of the screw stem on the dotted line $y, y$, of Fig. 2, showing forms of my invention.

$a$ represents the head of the bolt and $b$ the stem of the bolt. This stem is shown as screw-threaded for its whole length, but parts of the stem may be plain and the remainder screw-threaded, for either form of construction is of ordinary character.

$c$ represents the nut.

Referring particularly to Fig. 2, 2 and 3 are holes bored in various sizes. These holes are made approximately parallel or at a slight angle to the edge face of the nut and substantially tangential with the threaded stem of the bolt, or with the hole of the nut. These holes are also formed through the nut from one face through the opposite face in a central plane parallel with the flat faces of the metal. This will appear by comparison of the respective figures of the drawing. These holes are of off-set diameters, the one of larger dimensions being formed through to about the center of the nut and the one of smaller diameter through the other half of the nut.

$d$ represents a pin with a head $d^1$ preferably beveled in opposite directions to provide a peripheral edge adapted to bear against and to be partly embedded in the screw threads of the bolt stem to maintain the nut in position thereon. The stem is slightly smaller than the hole 3 and the head slightly smaller than the hole 2, so that the pin passes freely into position, being entered through the larger hole so that the head of the pin seats upon the metal of the nut at the base of the larger hole, and I provide a spring filling the larger hole above the head of the pin. This spring may be the wire helix $e$ or the rubber block $e^1$ and I prefer by use of a suitable die to over-turn the edges of the hole at 4 so as to contract the opening therein and confine the spring of either form in the hole and prevent it accidentally coming away from the nut.

In the form of my invention shown in Fig. 4, the head $d^1$ of the pin is received between the thread convolutions of the stem of the bolt, so that it bears at two places thereon, while from the form of my invention shown in Fig. 5 it will be seen that the head $d^1$ of the pin at its periphery rests upon the apex or point of the thread, and I do not limit myself in these particulars.

In the operation of the device of my improvement, the arrows Figs. 2 and 3, indicate the direction of the rotation of the nut $c$ considering that the bolt head and stem are held stationary. From this direction of rotation it will be apparent that the turning of the nut has the tendency of moving the pin and its head along against the expansive action of either form of spring, causing the head of the pin to slide on the apex of the thread convolutions, or slip in the intervening groove, therefore the nut when the bolt is in position can be screwed upon the same and be brought taut up to the work which is to be held, and that when taut the head of the pin is seated against the thread convolutions of the stem assisted by the expansive action of the spring, and that any effort to turn the bolt in the opposite direction would cause the head to embed firmly in the metal of the bolt to counteract said movement and lock the bolt effectually in position.

By prolonging the free end of the pin $d$ beyond the outer surface of the nut, I provide for releasing the head of the pin from contact with the groove of the threaded bolt stem and at the same time compressing the spring, whereby the bolt can be turned in the opposite direction and removed from the stem when desired. This may be effected in any desired manner, but I prefer and find it possible in practice to use the ordinary wrench because the pressure of the jaws of the wrench on the edges of the nut where the pins project, pushes in the pins and releases the heads to contact with the threaded stem of the bolt and makes it possible to unscrew the nut. The position of the wrench is shown by dotted lines in Fig. 3, from which it will be apparent that the jaws of the wrench are pushing on the pins, causing the nut to be free on the stem of the bolt.

I claim as my invention:

1. The combination with the head and continuous threaded stem of a bolt, of a nut provided with alined holes of different diameters, the division of which comes at about the center of the nut, a pin received in the smaller of said holes having a head with a conical periphery received in the larger of said holes and seated at said division line, and the said conical head adapted to bear upon the thread convolutions of the bolt and lock the nut against unscrewing.

2. The combination with the head and continuous threaded stem of a bolt, of a nut provided with alined holes of different diameters, the division of which comes at about the center of the nut, a pin received in the smaller of said holes having a head with a conical periphery received in the larger of said holes and seated at said division line, and the said conical head adapted to bear in the groove between the thread convolutions and lock the nut against unscrewing, and means for holding the pin yieldingly in place.

3. The combination with the head and continuous threaded stem of a bolt, of a nut provided with alined holes of different diameters, the division of which comes at about the center of the nut, a pin received in the smaller of said holes having a head received in the larger of said holes and said head beveled at opposite parts to provide a circumferentially disposed conical periphery seated at said division line and the said conical head adapted to bear upon the thread convolutions of the bolt and lock the same against unscrewing.

4. The combination with the head and continuous threaded stem of a bolt, of a nut provided with alined holes of different diameters, the division of which comes at about the center of the nut, a pin received in the smaller of said holes having a head received in the larger of said holes and said head beveled at opposite parts to provide a circumferentially disposed conical periphery seated at said division line and the said conical head adapted to bear in the groove between the thread convolutions and lock the nut against unscrewing, and means for holding the pin yieldingly in place.

5. The combination with the head and continuous threaded stem of a bolt, of a nut provided with alined holes of different diameters, the division of which comes at about the center of the nut, the axial line of said holes being at a slight angle to the edge face of the nut and substantially tangential to the threaded stem of the bolt, a pin received in the smaller of said holes having a head with a conical periphery received in the larger of said holes and seated at said division line, and the said conical head adapted to bear upon the threaded stem of the bolt to lock the nut against unscrewing.

6. The combination with the head and continuous threaded stem of a bolt, of a nut provided with alined holes of different diameters, the division of which comes at about the center of the nut, a pin received in the smaller of said holes having a head with a conical periphery received in the larger of said holes and seated at said division line, and the said conical head adapted to bear upon the threaded stem of the bolt to lock the nut against unscrewing, and a spring in the larger of said holes bearing against the head of the pin and the circumferential edge of the larger hole at the bolt surface overturned as at 4 to hold the spring member in position.

Signed by me this 9th day of March 1908.

EDWIN B. WILES.

Witnesses:
ARTHUR H. SERRELL,
E. ZACHARIASEN.